United States Patent [19]
Rhodes

[11] 3,900,270
[45] Aug. 19, 1975

[54] SHAFT COUPLINGS
[75] Inventor: John Kenneth Rhodes, Sunnyhill, England
[73] Assignee: Rolls-Royce (1971) Limited, London, England
[22] Filed: Sept. 5, 1974
[21] Appl. No.: 503,509

[30] Foreign Application Priority Data
Sept. 22, 1973 United Kingdom............. 44546/73

[52] U.S. Cl. ................. 403/317; 403/359; 403/370
[51] Int. Cl.²........................................... F16D 1/08
[58] Field of Search ........... 403/316, 370, 320, 317, 403/359, 371

[56] References Cited
UNITED STATES PATENTS
2,785,550  3/1957  Petrie............................. 403/316 X
3,182,986  5/1965  Brockman..................... 403/370 X
3,622,185  11/1971  Rosan et al....................... 403/316

Primary Examiner—Andrew V. Kundrat
Attorney, Agent, or Firm—Cushman, Darby & Cushman

[57] ABSTRACT

This invention concerns a coupling device particularly suitable for securing together two portions of a gas turbine engine main shaft. The coupling comprises a splined joint which is secured against both axial and rotational movement by means of two opposed tapered collets.

1 Claim, 2 Drawing Figures

SHAFT COUPLINGS

This invention relates to a device for securing together two rotatable shafts such as two portions which together make up a main shaft of a gas turbine engine.

In the past it has been well known to manufacture gas turbine engine shafts from two or more separate portions to facilitate assembly of the remainder of the engine components. Many types of coupling devices have been evolved to secure the separate shaft portions to each other, most of these couplings have taken the form of either co-operating splines or pin joints which are provided with locking means such that the portions of the shaft will not become detached from one another when in operation. One of the main problems which has been encountered with the abovementioned type of joints is that when the shaft is in operation the shaft portions tend to articulate about the coupling thus causing excessive wear and possibly eventual failure of the coupling. This is obviously extremely undesirable especially in the case of a coupling used in an aircraft gas turbine engine.

An object of the present invention is to provide a shaft coupling which is not as susceptible to articulating movement as a conventional shaft coupling.

A further object of the invention is to provide a shaft coupling by means of which one shaft portion may be moved axially with respect of the other shaft portion without necessitating the complete dismantling of the coupling.

According to the present invention a shaft coupling comprises a first shaft portion and a second shaft portion, one shaft portion being hollow and being provided with axially extending internal splines, said splines being adapted to co-operate with a further set of splines provided upon the external periphery of the other said shaft portion, the shaft portions being restrained from moving axially relative to one another by two annular members which are located upon one said shaft portion and which are provided with tapering surfaces which co-operate with corresponding tapering surfaces provided on the other said shaft portion, means being provided for translating and locking the annular members on the one said shaft portion.

Preferably the annular members are secured to the said shaft portion by means of screw-threaded nuts which engage screw threads on said one shaft portion to urge the corresponding tapering surfaces on the annular members and said other shaft portion into engagement, each nut being provided with securing means which are adapted to secure the nut against relative rotation with the shaft portion.

The nut securing means may comprise two axially moveable members which are provided with a plurality of axially extending splines which co-operate with further splines provided upon the nuts, one nut securing member being provided with a spring loaded plunger arrangement to restrain it from axial or rotational movement.

An embodiment of the invention will now be more particularly described by way of example only and with reference to the accompanying drawings in which.

Figure 1:
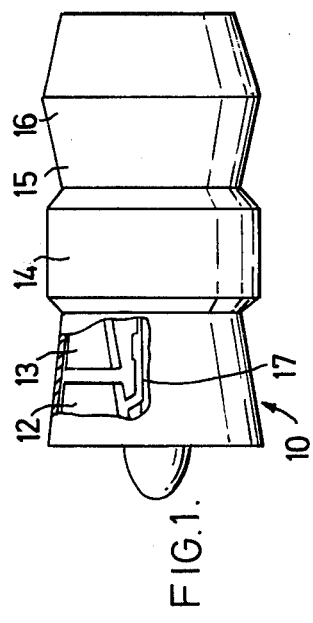
FIG. 1 shows a pictorial view of a gas turbine engine having a broken away casing portion disclosing a diagrammatic view of an embodiment of the present invention.

Referring to FIG. 1 a gas turbine engine shown generally at 10 comprises in flow series a low pressure compressor 12, a high pressure compressor 13, combustion equipment 14, a high pressure turbine 15 and a low pressure turbine 16 and terminates in an exhaust nozzle. The compressor 12 and turbine 16 being rotatably mounted upon a common shaft shown generally at 17, the high pressure compressor 13 and high pressure turbine 15, being rotatably mounted upon a further common shaft not shown.

Figure 2:
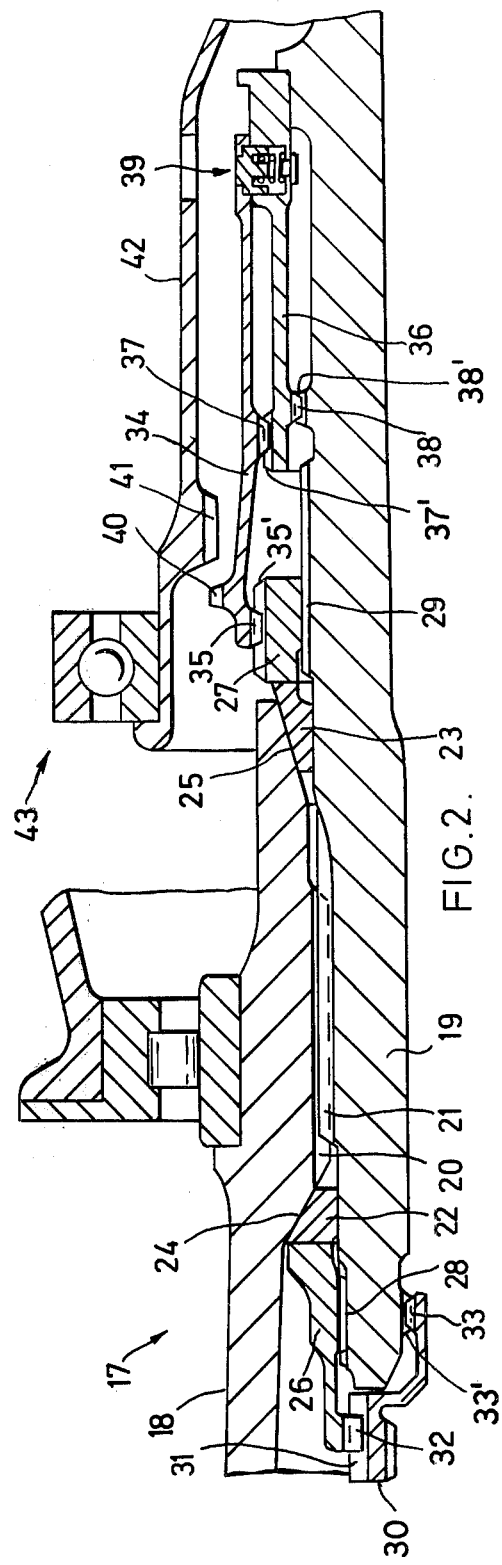
FIG. 2 shows an enlarged cross-sectional view of the embodiment shown diagrammatically at FIG. 1.

FIG. 2 shows an enlarged view of the shaft shown generally at 17 incorporating a coupling device made in accordance with the present invention. The device comprises two coaxially disposed main shaft portions 18 and 19 which are restrained rotationally with respect of each other by means of co-operating splines 20 and 21. The shaft portions 18 and 19 are restrained from moving axially by means of a pair of tapered collets 22 and 23 having tapers which are adapted to co-operate with tapers 24 and 25 provided upon the internal surface of the shaft portion 18. The word taper throughout this specification should be understood to include any surface which has a radially increasing dimension with axial length for example conical or curved surfaces. The collets 22 and 23 are urged into contact with the shaft 18 and are subsequently secured by means of nut members 26 and 27 which co-operate with screw threaded portions 28 and 29 provided upon shaft portion 19.

The nuts 26 and 27 may be secured rotationally. In the case of nut 26 the securing means comprises an annular member 30 which is provided with a first pair of radially outwardly extending splines 31 which co-operate with radially inwardly extending sets of splines 32 provided upon nut member 26, and a second set of radially outwardly extending splines 33 which are adapted to co-operate with a set of radially inwardly extending splines 33' provided upon a portion of the internal diameter of the shaft portion 19. The annular member 30 is usually secured axially by means of additional engine structure not shown in the drawings, however, it could equally conveniently be secured by making it a tight fit within shaft portion 19 or conventional tab or cup locking or spring ring.

The second of the nuts 27 may also be secured against relative rotation with shaft portion 19 by means of a cylindrical member 34 which is provided with radially inwardly extending splines 35 which in turn co-operate with a further set of splines 35' provided upon the external periphery of the nut 27. The cylindrical member 34 is in turn secured by means of a secondary cylindrical member 36 and two sets of co-operating splines a first set 37 and 37', respectively, and a second set 38 and 38', respectively. The cylindrical member 34 is also secured against relative axial movement by means of a spring loaded pin arrangement provided within the second cylindrical member 36 and shown generally at 39 which co-operates with an aperture provided within the first cylindrical member 34. It will be understood that there will be several apertures angularly disposed of which one is chosen appropriate to setting required.

It will be appreciated that the described device provides a relatively simple method of providing axial adjustment to the two shaft portions 18 and 19 relative to each other whilst in the confines of a gas turbine engine. The collet 22 is quite simply adjusted by removing the annular locking member 30 and then inserting a suitable shaped spanner which co-operates with the splines 32 provided upon the nut 26. Thus by rotating the nut the collet may be moved axially with respect to the shaft 19.

Axial movement of the collet 23 is effected in a rather different way. Firstly it is necessary to depress the spring loaded plunger shown generally at 39 such that the cylindrical member 34 may be moved axially with respect to the shaft members 18 and 19 until the splines 40 provided upon the cylindrical member 34 come into engagement with the splines 41 provided upon a further cylindrical member 42 which is in turn supported by bearing shown generally at 43. It will also be appreciated that axial movement of the cylindrical member 34 will cause splines 37 and 37' to move out of engagement with each other such that the cylindrical member 34 and nut 27 which is splined to member 34 become freely rotatable with respect to shaft 19 upon which the nut is mounted by means of screw threaded portion 29. It will therefore be appreciated that rotational movement of the cylindrical member 42 will be transmitted via splines 40 and 41 through cylindrical member 34 to nut member 27 which enables the collet 23 to be displaced axially with respect to the shaft 19.

After any necessary adjustment is made, the cylindrical member 34 is displaced axially such that the spring loaded plunger shown generally at 39 moves radially outwardly into a corresponding shaped aperture provided within the cylindrical member 34. The arrangement is then suitably clamped up by means of a spanner applied to nut member 26 the annular locking member 30 being subsequently replaced so that the splines 32 provided upon the nut 26 engage the splines 31 and the splines 33' provided upon shaft 19 engage with the splines 33.

It will be appreciated that by provision of the two collets 22 and 23 bending or articulation within the coupling is virtually eliminated.

I claim:
1. A shaft coupling comprising:
a first shaft portion and a second shaft portion, one of said shaft portions having axially extending external splines and the other of said shaft portions being hollow and having axially extending internal splines arranged to cooperate with the external splines of one of said portions;
means to restrain said shaft portions from moving axially relative to one another, said means including two annular members carried upon one of said shaft portions and having tapering surfaces, the other of said shaft portions having cooperating corresponding tapering surfaces;
means for translating said annular members on the one of said shaft portions, said translating means including screw nuts for respectively urging the tapering surfaces of said annular members into engagement with the tapering surfaces of the other of said shaft portions, screw threads on the one of said shaft portions for cooperating with said screw nuts;
and means for locking said annular members on the one of said shaft portions for securing the screw nut against relative rotation with said shaft portions, said locking means comprising two axially movable members, each having a plurality of axially extending splines, said screw nuts having axially extending splines cooperating with said axially extending splines of said axially movable members, and one of said axially movable nut securing members having a spring-loaded plunger member to restrain it from both axial and rotational movement.

* * * * *